United States Patent
Exner

(10) Patent No.: US 6,354,423 B1
(45) Date of Patent: Mar. 12, 2002

(54) METHOD AND DEVICE FOR DISTRIBUTING A FLOW OF BULK MATERIAL AMONGST SEVERAL SUB-FLOWS

(76) Inventor: Hubertus Exner, Am Zauberberg 2 A, D-38667 Bad Harzburg (DE)

(*) Notice: Subject to any disclaimer, the term of this patent is extended or adjusted under 35 U.S.C. 154(b) by 0 days.

(21) Appl. No.: 09/601,848
(22) PCT Filed: Jan. 28, 1999
(86) PCT No.: PCT/EP99/00560
§ 371 Date: Aug. 7, 2000
§ 102(e) Date: Aug. 7, 2000
(87) PCT Pub. No.: WO99/39998
PCT Pub. Date: Aug. 12, 1999

(30) Foreign Application Priority Data

Feb. 5, 1998 (DE) ......................................... 198 04 342

(51) Int. Cl.$^7$ ............................................. B65G 11/00
(52) U.S. Cl. ........................................... 193/29; 193/14
(58) Field of Search .................... 198/532; 193/2 R, 193/14, 23, 28, 29, 2 B, 34

(56) References Cited

U.S. PATENT DOCUMENTS

| | | | |
|---|---|---|---|
| 134,399 A | * 12/1872 | Rowland | 193/29 X |
| 184,387 A | * 11/1876 | Kelsey | 193/29 |
| 369,390 A | * 9/1887 | Briggs | 193/29 |
| 388,542 A | * 8/1888 | Du Bois | 193/29 X |
| 483,404 A | * 9/1892 | Stuebner | 193/29 |
| 2,674,381 A | 4/1954 | Cady | 214/17 |
| 2,758,752 A | 8/1956 | Badavas et al. | 193/29 |
| 4,260,458 A | 4/1981 | Weber et al. | 202/121 |
| 4,972,970 A | * 11/1990 | Toerner | 193/2 B X |

FOREIGN PATENT DOCUMENTS

| | | |
|---|---|---|
| DE | 2756330 | 6/1974 |
| WO | WO 94/24029 | 10/1994 |

* cited by examiner

*Primary Examiner*—James R. Bidwell
(74) *Attorney, Agent, or Firm*—Barlow, Josephs & Holmes, Ltd.

(57) ABSTRACT

A method for distributing a flow of bulk material amongst several sub-flows. The method is characterized in that the flow of bulk material accumulates in an essentially vertically oriented pipe. The sub-flows branch off from the accumulated flow of bulk material are led over a horizontal or slightly inclined section so that a bank forms inside and blocks the sub-flow. The bulk material is then removed from the sub-flow by vibration, the bank block being constantly replaced by the particles which slide down correspondingly. A device for distributing a flow of bulk material amongst several sub-flows utilizes a supply container located upstream connected to at least one substantially vertical distribution pipe connected downstream. The distribution pipe has at least one part that branches off with a branch pipe connected thereto and with the branch pipe having a section which is positioned at a slightly smaller downstream angle than the bank of bulk material.

11 Claims, 1 Drawing Sheet

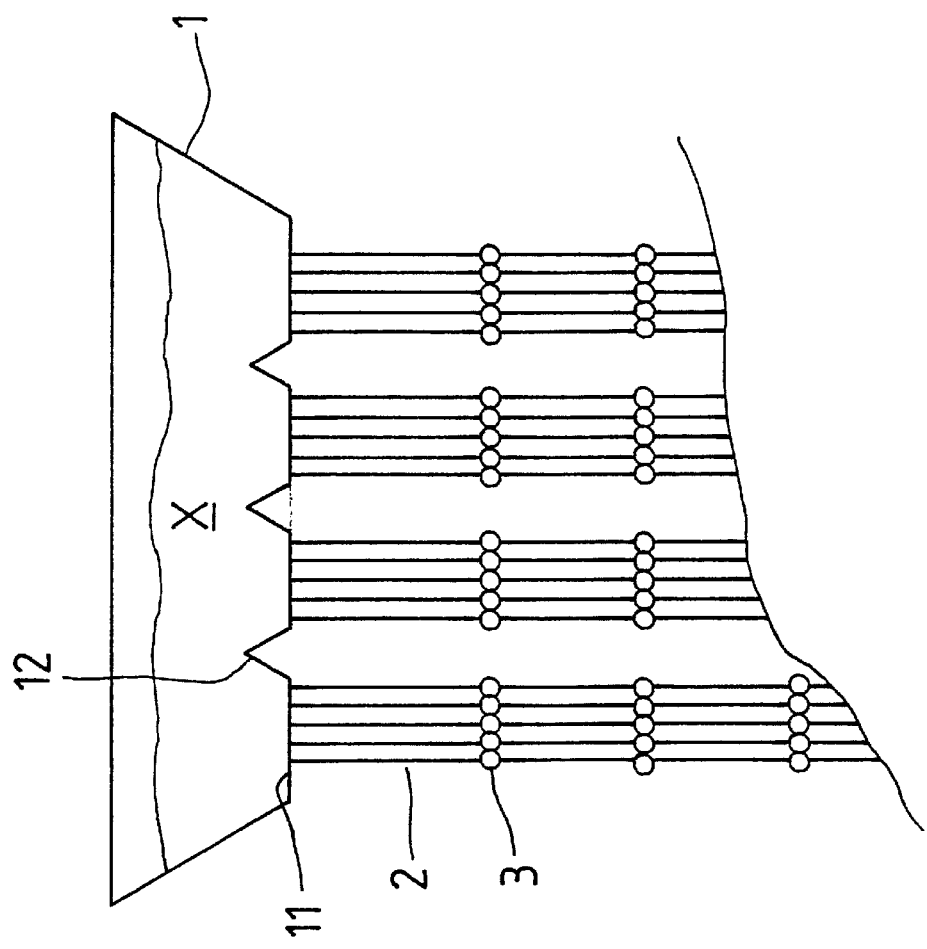
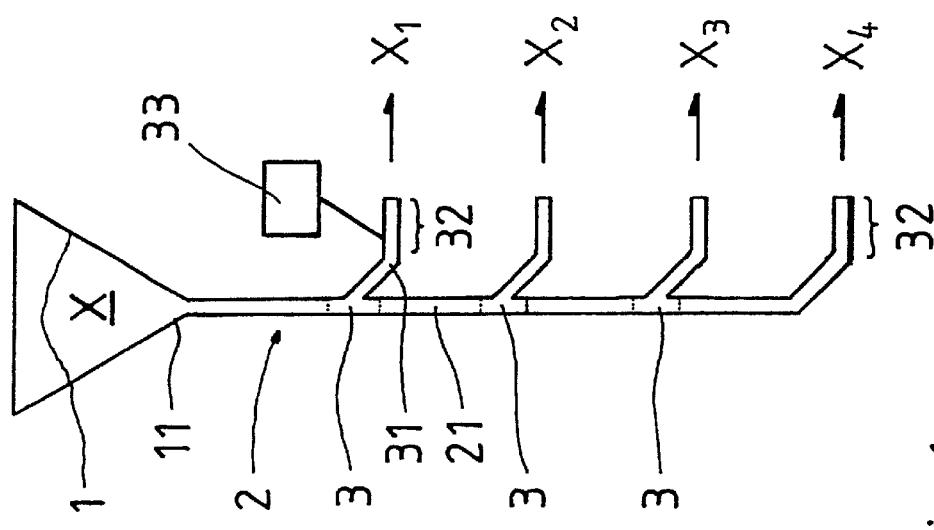
Fig. 2
Fig. 1

METHOD AND DEVICE FOR DISTRIBUTING A FLOW OF BULK MATERIAL AMONGST SEVERAL SUB-FLOWS

BACKGROUND OF THE INVENTION

The invention relates to a method and a device for dividing a flow of bulk material into a plurality of sub-flows.

When processing flowable bulk materials, particularly, waste glass fragments, the problem arises of uniformly dividing-up a flow of such material into two or more smaller flows of the material. This is often necessary for the further processing of the material, for example, sorting the bulk material in terms of size, color, weight, etc.

A conveying and distributing plant for bulk materials such as sand, chemical granulates or the like is known from U.S. Pat. No. 2,674,381 wherein a feed flow of such materials is supplied to a horizontal conveying region, which is coupled to a vibrator and which also executes vertical movements. The vibrator advances the bulk material towards filler-openings in the conveying region, or to a conveyor trough, into which the bulk material falls insofar as the filler opening is not already filled with bulk material. Above the filler-openings, the bulk material builds up into a small hill which is mechanically smoothed should it become too large in order to avoid reactions with the feed flow for example. In the ideal case, the un-discharged bulk material above the filler-openings is then passed onto the next filler opening so that it can be re-subjected to the processing action. The danger of blockage can only be avoided with the aid of a complex mechanical arrangement.

U.S. Pat. No. 2,758,752 describes a plant, with the aid of which granulate or flowable solids from a single supply source can be distributed to a plurality of processing stations. This plant comprises a vertical shaft having a plurality of inclined, downwardly extending bifurcations along its length. These bifurcations each end in a funnel. The funnel is provided with blocking mechanisms. As soon as a funnel is full of material, it automatically blocks the bifurcation and thereby stops any further supply of material. This is intended to ensure that each of the processing stations is either kept fully operational under optimum loading conditions, or can remain switched off. Complicated blocking mechanisms are required for the correct functioning of the plant.

Another method, which is also relatively complex, is described in WO 94/24029. Here, a chute whose inclination is greater than the maximum expected is angle of slope of the bulk material is provided for dividing a flow of bulk material into a plurality of sub-flows. Filler-openings are disposed in the chute for a plurality of stockpiling containers provided below the chute for the respective sub-flows. The filler-openings for the stockpiling containers are arranged in such a manner that reactions with the preceding stockpiling container can be precluded by virtue of the closure behavior. However, a disadvantage of this method and of this device is that a plant of this type is subject to failure due to its complex construction. Despite this complexity, consistent and uniform distribution of the bulk material flow is still not assured.

Furthermore, it has been shown in practice that methods used for Newtonian fluids are either not usable for bulk materials or can only be implemented with difficulty. The reason for this can be seen in the pseudo-plastic flow behavior of the bulk materials, i.e. a minimum shear force has to be overcome before the flowing motion can commence. This is physically apparent from the angle of slope of an accumulation of bulk material. In addition, the flow properties of bulk materials are dependent on external factors such as the moisture content, surface area and the shape and/or size of the constituents. Overall, the flow behavior of bulk material is non-linear.

In the case of other known systems of division, an alteration in the distribution in one sub-flow usually has an effect upon each or a plurality of the other sub-flows. Due to the non-linear behavior of the flow, these effects can only be anticipated to a limited extent and this thus makes it necessary to take extensive measures in order to effect corrections and maintain a uniform flow of material.

SUMMARY OF THE INVENTION

The object of the invention is to provide an arrangement for dividing bulk materials into a plurality of sub-flows thereby allowing a uniform distribution to be obtained without reactive effects, and which is constructed in as simple a manner as possible. This object is achieved by a method in accordance with claim 12 and by a device in accordance with claim 14.

Surprisingly, due to the bulk material being dammed in the form of a vertical column, uniform sub-flows will be branched off from openings in the envelope of the column (pipe) whereby, in each case, just that amount of particulate bulk material is moved out from the main flow as is being carried off in the sub-flow. That is to say, a stable static state is created at each of the openings, this state arising due to the bulk material settling at its angle of repose in the branch pipes. If particles of bulk material should now move out of the open end of the pipe, then in fact, just so many particles then flow in from behind as will allow the static state of a supporting medium deposited at its angle of slope to be recreated.

A vibratory action is used in order to assist the conveyance of the sub-flow in the downstream direction. It is thereby possible to affect the quantity of material being branched into the sub-flow. Additional blocking devices for the individual outlets are not required.

A device of this type is particularly economical if the distributing pipes, the bifurcations and the branch pipes consist of plug-in, synthetic material pipes such as are known from the field of sanitation. For example, conventional waste pipes of the required dimensions can easily be plugged together. If one section of pipe should wear out, a replacement pipe can easily be inserted. Waste pipes of this type can be obtained economically from stock at a building supply house or from specialty suppliers.

In addition to the self-induced vibrations occurring when the plant is in operation, conveyance of the bulk material along the substantially horizontally disposed branch pipes can be assisted or enabled by means of a vibration generator.

In order to permit the distribution to occur at differing floor levels, it is preferred that a plurality of bifurcations be arranged above one another along the distributing pipe. These bifurcated sub-flows disposed one above the other lead, for example, to one of a plurality of downstream, bulk material sorting plants which often require a considerable amount of space and are of limited processing capacity due to their mechanical devices.

A plurality of further processing plants may be provided downstream of the bifurcations on each of the floor levels by arranging for a plurality of distributing pipes to be laid alongside one another so that they are substantially parallel.

In the case of appropriately connected plants having five parallel processing troughs, it is preferred that five distributing pipes be grouped alongside one another in a row and/or that four mutually spaced groups of distributing pipes be arranged in a plane.

If the distributing pipes are supplied with bulk material from a stock-piling container, whereby the container has a V-shaped cross-section perpendicular to the plane formed by the distributing pipes and has elevated sections on the base of the container between the groups of distributing pipes in the longitudinal direction, it will be ensured that each of the mutually parallel distributing pipes will be properly filled without dead zones being created in the stock-piling container.

BRIEF DESCRIPTION OF THE DRAWINGS

The invention will be explained in detail hereinafter with reference to the accompanying drawings. Therein:

FIG. 1 shows a partially sectional side view of a distributing arrangement in accordance with the invention; and FIG. 2 a schematic view of an embodiment of the device in accordance with the invention employing twenty distributing pipes.

DETAILED DESCRIPTION OF THE PREFERRED EMBODIMENT

A bulk material distributing device is illustrated in FIG. 1 in the form of a partially sectional side view. At the top of the plant in the direction of flow of the bulk material, there is a stockpiling container 1 in which the bulk material X that is to be divided-up is stored. The stockpiling container 1 is preferably funnel shaped or has a V-shaped cross-section in the case of plants extending over greater lengths (FIG. 2). A pipe inlet region 11 is arranged at the lowermost end of the stockpiling container 1, and a substantially vertically disposed distributing pipe 2 is connected to said inlet region.

The distributing pipe 2 extends vertically, in a manner similar to a down pipe, through a plurality of floors of a building that may be located below the stockpiling container 1. The distributing pipe 2 is built-up from a plurality of plug-in pipe sections 21 consisting of conventional synthetic material waste pipes. Bifurcations 3 are inserted in this distributing pipe 2 at differing heights, these bifurcations also consisting of conventional waste pipe elements but, in contrast to such an assembly in a waste water down pipe for combining two waste water flows, these are rotated through 180° as they are inserted.

A branch pipe 31 is connected to the connection piece branching off from the vertical pipe train at each of the bifurcations 3, each branch pipe also consisting of standard waste pipe elements and comprising a sub-section 32 which is aligned substantially horizontally or with a slight fall in the downstream direction.

A means for generating vibrations 33 is actively coupled to the substantially horizontally aligned sub-section 32.

An embodiment of the device for distributing bulk material incorporating twenty distributing pipes 2 is schematically illustrated in FIG. 2. The device has a substantially one-piece stockpiling container 1 having a V-shaped cross-section as illustrated in FIG. 1 in a direction perpendicular to the plane of the drawing illustrated in FIG. 2. Four pipe inlet regions 11 are formed at the lower end of the stockpiling container 1, a plurality of wedge-shaped elevated sections forming partitioning lands 12 for preventing the occurrence of dead zones in the downwardly flowing bulk material being provided between said regions. A respective row of five directly juxtaposed distributing pipes 2 is connected to each of the pipe inlet regions 11. In all, four groups each of five distributing pipes 2 are connected to the stockpiling container 1.

Each group of distributing pipes extends substantially vertically through a plurality of floor levels and comprises five equally elevated bifurcations 3 at each of a plurality of appropriate elevations. Suitable plants for further processing the bulk material are connected to the five sub-flows of bulk material issuing from the bifurcations 3, for example, a device for isolating waste glass fragments and a subsequent plant for sorting them according to color.

The arrangement and lay-out of the distributing pipes 2 and the bifurcations 3 as well as the size and sub-division of the stock-piling container 1 may be grouped and disposed in dependence on the design of the plants that are to be connected to the sub-flows. In particular, the bulk material can be distributed uniformly to a plurality of plants arranged one above the other on a plurality of floors without thereby affecting the take-up of bulk material by each plant.

The method of dividing in accordance with the invention will be explained hereinafter.

The stockpiling container 1 is firstly filled with bulk material. This can be effected discontinuously such as by unloading a lorry for example, or it may be done substantially continuously by means of a conveyor belt. The bulk material X that has been loaded into the stockpiling container 1 falls down in funnel-like manner into the distributing pipe or distributing pipes 2 and completely fills it or them.

At each of the bifurcations 3, just that quantity of bulk material flows into the branch pipes as is required to establish therein a static state caused by the formation of a dam of bulk material in the substantially horizontal or slightly falling sub-section 32.

Sub-flows $X_{1\ldots4}$ emerge from the outlets of these branch pipes 31 as a result of the self-vibration of the operational plant or with the aid of vibrations generated by a vibratory device 33. The sub-flows $X_{1\ldots4}$ are supplied to the following, not illustrated plants.

The quantity of material being conveyed in the individual sub-flows $X_{1\ldots4}$ is merely dependent on the geometry and/or the arrangement of the last sub-section 32 of the branch pipe 31 and the vibrations. There is no mutual interaction between the sub-flows $X_{1\ldots4}$.

The quantity of material in the respective sub-flows can be precisely adjusted especially when using a controllable vibratory device 33. The particles of bulk material conveyed on each occasion are replaced by the descending upstream particles until a quasi-static form of support is created by the closure of the bifurcation with bulk material settling down at its angle of slope.

The plant is particularly economical and efficient due to the deceptively simple method of distribution and also due to the use of economical standard components (HT synthetic material waste pipes).

What is claimed is:

1. A method of dividing a flow of bulk material into a plurality of sub-flows, comprising the steps of:

flowing said bulk material into a substantially vertically oriented distribution tube until said bulk material fills said distribution tube;

branching off sub-flows of said bulk material from the said distribution tube through a branch tube having a downwardly angled portion connected to said distribution tube and an integral horizontal end portion extending substantially horizontally from said angled portion, said angled portion and said horizontal end portion cooperating to form a naturally occurring dam wherein said sub-flow of bulk material naturally and automatically settles at its angle of repose in said horizontal end portion; and conveying said sub-flow from said horizontal portion of said branch tube.

2. The method of claim 1, wherein said steps of conveying said sub-flow comprising the step of applying a vibratory action to said branch tube.

3. A device for dividing a flow of bulk material into a plurality of sub-flows comprising:

an upstream stock-piling container;

a substantially vertical distributing pipe with a first end and a second end opposite to said first end and a length between said first and second ends, wherein said first end is located downstream of and attached to said stock-piling container and through which bulk material is flowed in a first direction from said first end to said second end, and further, wherein said distributing pipe has multiple bifurcations along said length; and sub-flow channels connected to said distributing pipe at said bifurcations through which a discrete portion of said bulk material flow is directed, wherein said sub-flow channels have a first inclined portion arranged to flow said discrete portion of said bulk material in a second direction, said second direction at an angle less than perpendicular to and inclined toward said first direction, and a second integral horizontal end portion extending substantially horizontally from said inclined portion, said inclined portion and said horizontal end portion cooperating to form a naturally occurring dam wherein said discrete portion of bulk material naturally and automatically settles at its angle of repose in said horizontal end portion.

4. The device of claim 3 wherein said vertical distribution pipe is inclined.

5. The device of claim 3 wherein more than one said device is connected to said upstream stock-piling container.

6. The device of claim 3 wherein said sub-flow channels are substantially horizontal and aligned to direct flow in a second direction, substantially perpendicular to said first direction.

7. The device of claim 3 wherein a means for generating vibrations is connected to said sub-flow channels.

8. The device of claim 3 wherein a plurality of said bifurcations are arranged one above the other along said vertical distribution pipe.

9. The device of claim 3 wherein a plurality of said vertical distribution pipes are arranged substantially parallel to one another.

10. The device of claim 9 wherein five of said sub-flow channels are grouped together in a row.

11. The device of claim 9 wherein said vertical distribution pipes are supplied with said bulk material from a said stock-piling container, whereby said container has a V-shaped cross-section perpendicular to the plane formed by said distributing pipes and has elevated sections on the base of said container at locations between the groups of said distribution pipes in the longitudinal direction aligned with said row of said distribution pipes.

* * * * *